United States Patent [19]

Mathus et al.

[11] Patent Number: 4,927,604
[45] Date of Patent: May 22, 1990

[54] MULTIWELL FILTER PLATE VACUUM MANIFOLD ASSEMBLY

[75] Inventors: Gregory Mathus, Concord; George Lyman, Cape Porpoise, both of Mass.

[73] Assignee: Costar Corporation, Cambridge, Mass.

[21] Appl. No.: 280,170

[22] Filed: Dec. 5, 1988

[51] Int. Cl.⁵ .............................................. G01N 1/14
[52] U.S. Cl. ................................. 422/101; 436/178; 210/341; 210/406; 210/416.1; 210/455; 210/474; 210/477; 435/300; 435/301
[58] Field of Search .................. 422/99, 101, 102, 58; 436/177, 178; 210/809, 341, 406, 416.1, 455, 474, 477, 300, 301, 7; 356/244, 246

[56] References Cited

U.S. PATENT DOCUMENTS

| | | | |
|---|---|---|---|
| 3,990,852 | 11/1976 | Piazzi et al. | 422/102 |
| 4,090,850 | 5/1978 | Chen et al. | 422/58 X |
| 4,154,795 | 5/1979 | Thorne | 422/99 |
| 4,294,931 | 10/1981 | Levin et al. | 435/301 |
| 4,493,815 | 1/1985 | Fernwood et al. | 436/177 X |
| 4,526,690 | 7/1985 | Kiovsky et al. | 422/101 X |
| 4,797,259 | 1/1989 | Matkovich et al. | 356/246 X |

Primary Examiner—Barry S. Richman
Assistant Examiner—Lynn M. Kummert
Attorney, Agent, or Firm—Wolf Greenfield & Sacks

[57] ABSTRACT

A filtration system for handling an array of filter wells which are open at the top and closed by a filter membrane at the bottom. The system includes a manifold chamber defined by side and bottom walls and having a support for the wells which carries the filter membranes above the bottom walls so that filtrate may be drawn through the membranes. A vacuum fitting is connected to the chamber so that a low pressure source may be applied thereto, and a sealing sheet extends over the wells and having holes aligned with the open tops of the wells so that when the low pressure is applied to the chamber, filtrate may be drawn through the membrane.

23 Claims, 4 Drawing Sheets

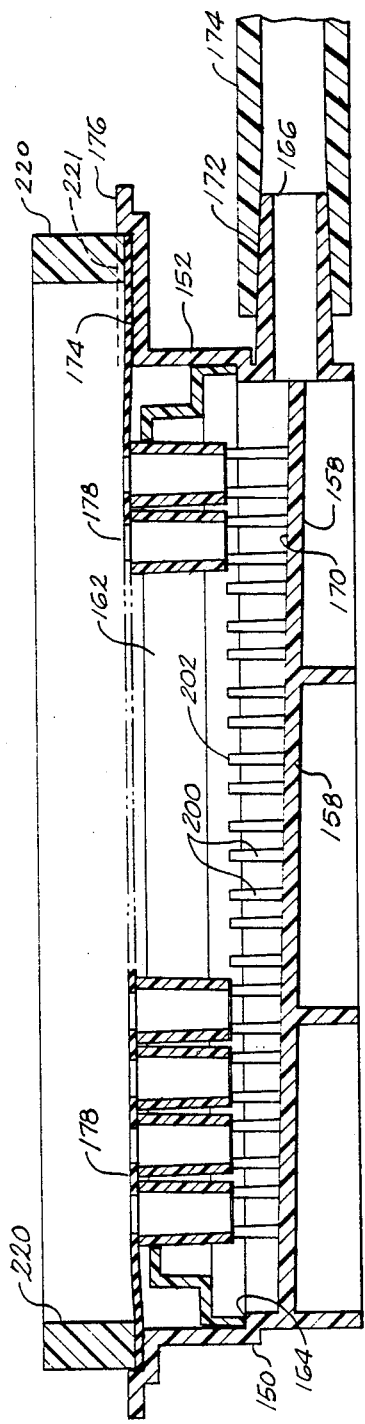
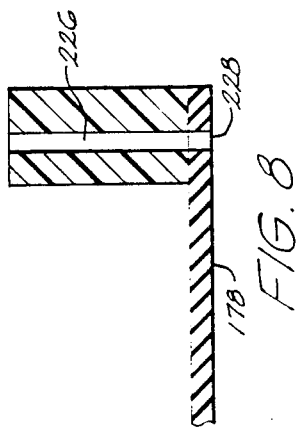
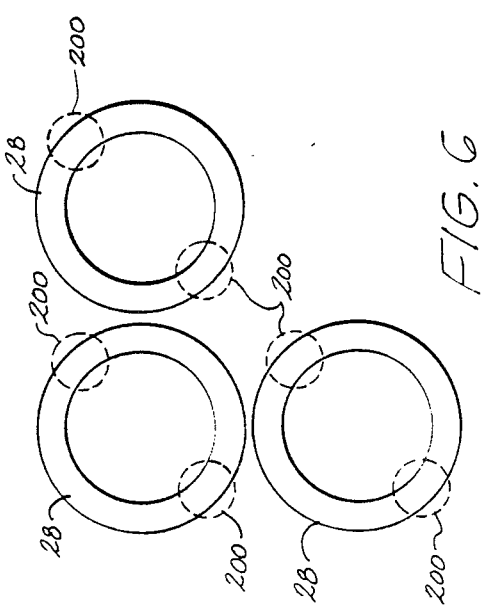

MULTIWELL FILTER PLATE VACUUM MANIFOLD ASSEMBLY

INTRODUCTION

This invention relates to filtration systems used in the laboratory employing multi well filters such as filter strips and filter plates for such applications as ELISA, RIA, Dot immunoblotting, DNA labeling and detection, receptor binding assays, membrane capture assays, bead or cell washing, etc. In particular, the present invention relates to a manifold assembly for handling the filter strips or plates to facilitate drawing a solution through the filter bottoms of the wells of the strips or plates.

In copending application Ser. No. 187,073 filed Apr. 28, 1988 entitled Filter Strip and Composite Assemblies and assigned to the assignee of the present application, a system is shown which filtering small quantities of liquid. The present invention is an improvement over that system and is particularly designed for use with 96 well filter plates and 96 well filter strip assemblies which include a number of separate strips assembled on a holder.

For a number of years manifold systems have been available for use with 96 well formats, but all of these systems have certain disadvantages. For example, the filter membranes in the prior art devices do not form separate and discreet filters for each of the wells, but rather are applied to the plates as a single sheet. Consequently, cross contamination due to wicking between the wells is possible. Furthermore, when 96 wells of the 96 well format are mounted on the manifold, any lack of seal between the filter surface and the manifold can cause either cross contamination between the wells or interfere with the vacuum which draws the filtrate from the wells.

One important object of the present invention is to provide a manifold system which may be used either with filter strips supported as a unit in a holder or with multi-well filter plates. It should be appreciated that while the system illustrated and described specifically shows and identifies the clusters as being 96 well formats, any other cluster plate configuration may be used so long as the manifold is sized and arranged to accommodate it.

The manifold of the present invention preferably is an injection molded part made of a material which is suitable either for one time use or which is more durable and capable of being sterilized for multiple applications. The manifold includes a bottom wall and upstanding side walls that together define the manifold chamber. Preferably the bottom wall of the manifold is inclined toward a lower end where a vacuum port is provided. Also in the preferred form, the bottom wall of the manifold is elevated so that a vacuum hose may be conveniently attached to it.

An array of posts are molded in the bottom wall, which extend upwardly therefrom so as to engage the bottom edges of the each well. These posts resist any flexing of the strip or plate when the vacuum is applied to the system. A support is provided in the side walls to engage the rim of the strip holder or the rim of the plate, and the parts of the manifold are so dimensioned that when the rim rests on the support, the lower edges of the wells just contact the posts.

While the wells either in the strips or plates are uniformly spaced and aligned in X and Y coordinates, the posts which support the wells are not so a to provide the maximum space between the posts and thereby prevent cross contamination. The spaced posts also allow the free flow of the filtrate on the bottom wall toward the vacuum port. In one embodiment of this invention, the posts are arranged on a diagonal matrix.

A sealing surface is provided adjacent the upper ends of the side walls to accommodate either a pressure or heat sealable film or a reusable rubber-like sheet. The sealing surface in the preferred embodiment substantially coplanar with the tops of the wells when the holder or plate rests on the support. When a film is used, the seal between it and the tops of the wells and the sealing surface is accomplished by physically bonding the film to the top edges of the wells and the surface. On the other hand, when a rubber-like sheet is used, the seal is accomplished by the vacuum pulling on the soft compliant sheet material, which draws it down onto the sealing surface and against the edges of the wells. The film or rubber-like sheet is provided with a matrix of holes which are equal to or smaller than the open top ends of the wells, and the holes align themselves with the tops of the wells when the film or sheet used is properly oriented on the manifold. The holes in the film or sheet provide access to the wells while the the film or sheet seals the spaces between the wells.

As yet another feature of the present invention, a second sealing surface is provided adjacent the tops of the side walls to which a final seal may be applied to the manifold for shipping and to maintain the sterility of the assembly, particularly when it is sold as a disposable.

If the rubber-like sheet is used to seal the manifold, in the preferred form, the sheet is carried by a rigid rim which assists in handling the sheet and in accurately positioning it on the manifold.

Yet another feature of the present invention is the provision of a hole in the rim of the sheet which can be covered by the finger of the user, and which allows the user to disable the vacuum system by allowing free flow of air through the manifold. By covering the hole, the vacuum is applied to the manifold, which allows the filtrate to be drawn through the filters.

These and other object and features of this invention will be better understood and appreciated for the following detailed description of several embodiments thereof, selected for purposes of illustration and shown in the accompanying drawings.

BRIEF FIGURE DESCRIPTION

FIG. 4 is a cross-sectional view of the manifold and showing a filter strip and holder supported in the manifold chamber and a sealing sheet over the wells, all in a 96 well format;

FIG. 6 is an enlarged diagrammatic view of the post arrangement in the manifold of FIGS. 4 and 5 and showing their relationship to the filter wells which they support;

FIG. 8 is a fragmentary cross-sectional view of the sheet and rim of FIG. 7.

DETAILED SPECIFICATION

Filter Strip, Holder and Plate

Figure 1:
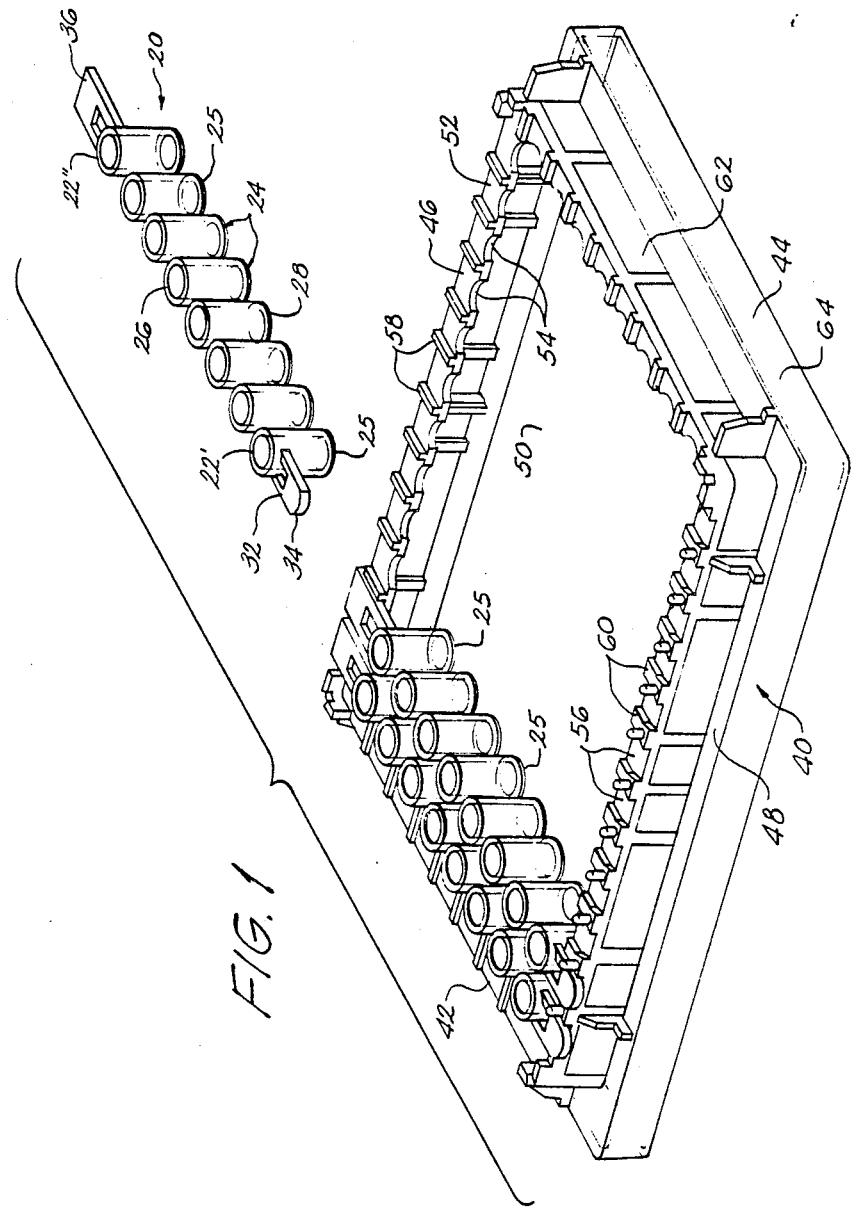
FIG. 1 is an exploded perspective view of a plurality of filter strips and a holder which may be used in the filtration system of the present invention.

FIG. 1 illustrates a filter strip and holder assembly which may be used in the system of the present invention. The strip and holder are described in detail in copending applications Ser. Nos. 06/923906 filed Oct. 28, 1986 entitled Multi-Well Test Plate and Ser. No. 187,083, supra, both assigned to the assignee of the present application and incorporated herein by reference. The details of the strip and holder do not per se form part of the present invention, but an understanding of the structure is important for a full appreciation of the features of the assembly of the present invention.

The individual filter strips 20 are each composed of a row of eight wells with each well having a generally cylindrical side wall 24 that may be tapered slightly for the convenience of molding. The side wall has top and bottom edges 26 and 28. The bottom of each well carries a filter membrane 25 while the top of each is open. The individual wells are connected by a frangible T-shaped connector (not shown) which is sufficiently stiff and so configured as to maintain the wells of the strip with their axes in parallel relationship and with the corresponding top and bottom edges in flat, parallel planes. End well 22' carries a tab 32 with a round end 34, while the other end well 22" has a rectangular tab 36. The different configurations of the tabs 32 and 36 require special orientation of the strips when mounted in the holder 40.

The holder 40 designed to carry twelve filter strips 20 (for a total of 96 wells), consists of opposite pairs of vertical side walls 42, 44 and 46, 48, which form a rectangular frame having a central opening 50. A horizontal top flange 52 extends inwardly from the top edges of the side walls, and a plurality of seats 54 and 56 are formed on the upper surfaces of the flange 52 for receiving the tabs 32 and 36 on the opposite ends of the strips 20. It will be noted that the seats 54 are defined by parallel ribs 58 so that the rectangular tabs 36 may be positioned on the seats 54. Ribs 60 which define the margins of the seats 56 on the other hand are curved, so as to receive the tabs 32 having the rounded ends. It is evident that if a user attempts to place a strip 20 on the holder 40 with the tab 36 in the seat 56, the strip will not seat properly on the holder. Other arrangements may be used, but it is most desirable that some method be provided for orienting the strips on the holder.

The holder 40 also includes a lower ledge 62 that extends outwardly from the bottoms of the vertical walls 42, 44, 46 and 48, and a downwardly extending peripheral lip 64 is connected to the outer edge of the ledge 62. The lower edge of the lip 64 defines a support for the holder when placed on a surface. The geometry of the strips and holder is such that when the strips are mounted on the holder registering with the seats 54 and 56, the bottom edges 28 of the wells and their filter membrane in the strip 25 lie above the plain of the lower edge of the lip 64. Therefore, the filter 25 which closes the bottom of each well 22 will not make contact with the supporting surface on which the holder is placed assuming, of course, that the surface is flat.

Figure 2:
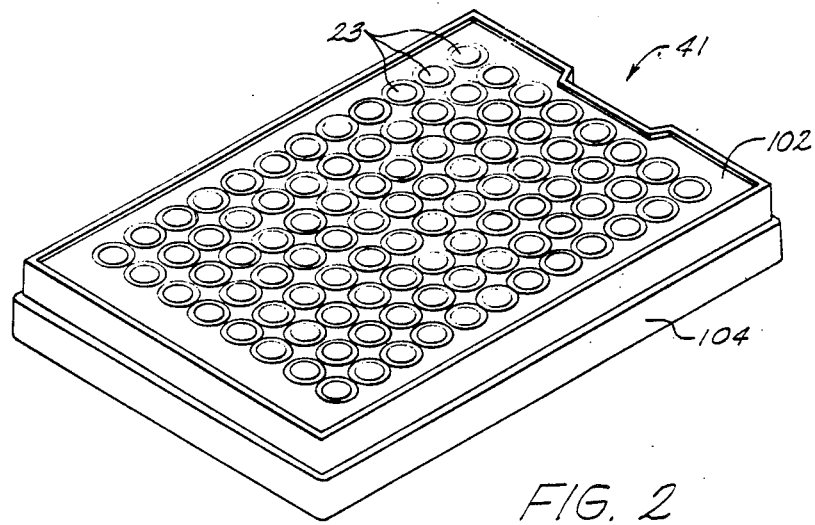
FIG. 2 is a perspective view of a 96 well filter plate which also may be used in the filtration system of the present invention.
Figure 2A:
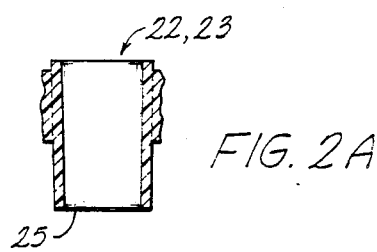
FIG. 2A is an enlarged cross-sectional view of one well of the strip of FIG. 1 or the plate of FIG. 2.

In FIG. 2, a 96 well filter plate 41 is shown, which may also be used with the system of the present invention instead of the strips 20 and holder 40. The orientation of the wells 23 in the plate 41 is the same as the orientation of the wells 22 of the several strips 20. When the holder 40 is fully loaded with 12 strips having 8 wells each, the combination of the strips and holder of FIG. 1 is the functional equivalent of the 96 well filter plate shown in FIG. 2.

The 96 well plate of FIG. 2 includes a horizontal wall 102 on which the several wells are formed as well as a downwardly extending lip 104 (which is the equivalent of the lip 64 of the holder 40 in FIG. 1). The bottom edge of the lip 104 serves to support the 96 well filter plate on a surface. The lower ends of the wells in the plate each carry a filter membrane 106 like the membrane 25 carried on the bottoms of the wells 22 of the strips 20.

The Manifold

The manifold shown in FIGS. 3 to 6 includes opposite pairs of end and side walls 150, 152 and 154, 156. The end and side walls support a bottom wall 158 above the lower edges 16 of the end and side walls, and the bottom wall 158 is shown in FIG. 4 to be inclined slightly in a downward direction from the end wall 150 to the other end wall 152. The bottom and side walls together define a chamber 162 which is open at the top.

The end and side walls 150, 152, 154 and 156 are each provided with a step 164 which together serve as a seat for either the lower edge of the lip 64 of strip holder 40 or the lower edge of the lip 104 of the 96 well plate, which is used in the system.

Figure 3:
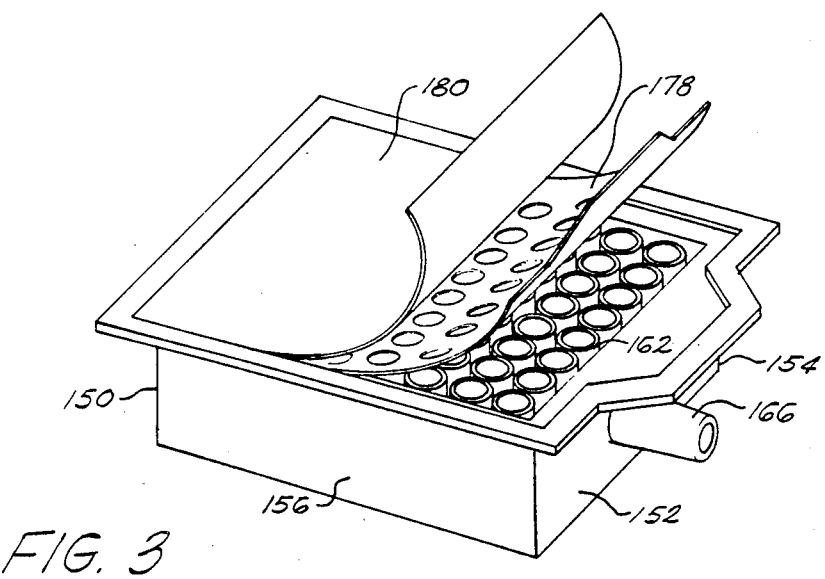
FIG. 3 is a perspective view of a manifold assembly constructed in accordance with this invention and shown containing an array of filter wells and carrying a partially peeled away sterile shield and a sealing sheet for the manifold chamber (for purposes of clarity, a smaller format of 24 wells is suggested)

In FIGS. 3 and 4 a tube fitting 166 is shown carried on the end wall 152. The fitting is adapted to connect the manifold to a vacuum system (not shown) which will create a differential pressure across the filter membranes 25 or 106 that span the bottoms of the wells in order to draw filtrate through them. (Hereinafter the system will be described as used with the strips and holder, but it should be appreciated that the 96 well filter plate may be used. Formats of other members of wells may also be used.) The fitting includes an internal passage 168 which enters chamber 162 with the bottom of the passage coplanar with the upper surface 170 of bottom wall 158. The outer surface 172 of the fitting 166 is tapered slightly so as to form a seal with the hose 174 connected to it.

The upper ends of the end and side walls 150, 152, 154 and 156 of the manifold are provided with a pair of seats 174 and 176 disposed in closely adjacent planes. The lower of the two seats 174 provides a support for the periphery of a flexible sheet 178 which seals the area between the wells of the strips mounted in the manifold when the system is in use. The sheet 178 is described in greater detail below. The second seat 176 may employ a heat sealable film 180 as suggested in FIG. 3, when the manifold is manufactured and packaged as a disposable item so as to maintain the interior of chamber 162 in sterile condition. The film 180 would be used in combination with a cap or plug (not shown) which would close and seal the fitting 166.

Figure 5:
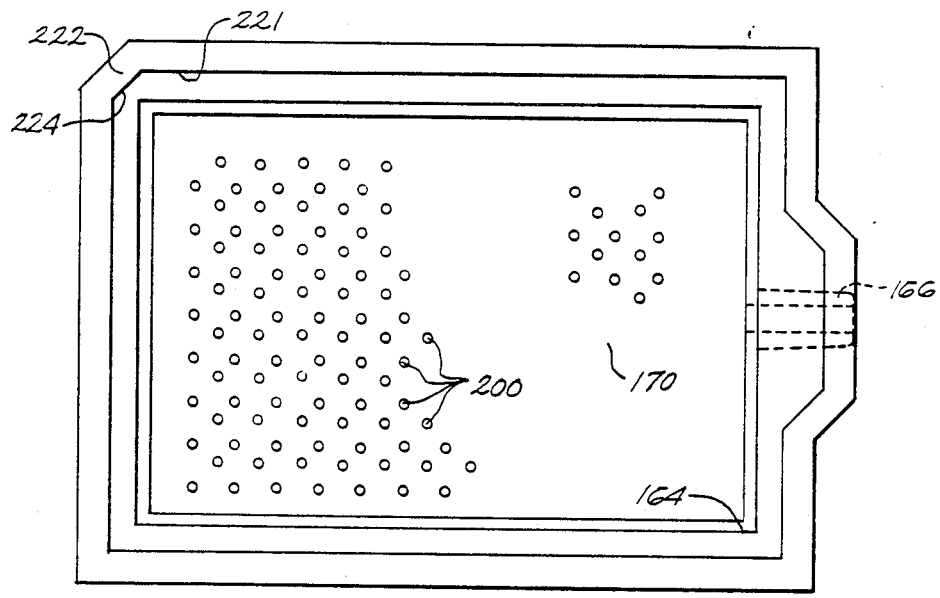
FIG. 5 is a top plan view of the manifold of FIG. 4.

In FIGS. 4 and 5 an array of pins 200 is shown formed on the upper surface 170 of bottom wall 158. The upper ends 202 of the pins are coplanar and would be disposed horizontally when the lower edge 160 of the manifold is placed on a horizontal surface. The pins 200 are arranged in a diagonal matrix in the embodiment shown, and they act in pairs to engage the bottom edges 28 of the wells when the holder 40 is placed with the bottom edge of the lip 64 supported on shoulder 164. As is illustrated in FIG. 6, the pins 200 act in pairs so that two support the lower edge and are displaced 180 degrees from one another. The pins support each of the filter wells to counteract any downwardly directed force applied to the strips when a vacuum is applied to the manifold through the fitting 166 as is described in greater detail below. The pins are arranged in diagonal rows so as to maximize the space between the pins supporting adjacent wells and prevent cross-contamination between the wells. It will be appreciated that if the pins were uniformly spaced in rows conforming to the X and Y coordinates of the layout of the wells in the strips and holder assembly, the pins would lie very close to one another so as to afford "cross-talk" between the wells via the pins.

To enable the pins to support the well strips against downward deflection, the vertical distance between the shoulder 164 and the tops 202 of the pins must rather precisely equal the vertical distance between the lower edge of lip 64 and the lower edge 28 of the wells (or filter membrane).

As suggested above, the sheet 178 whose periphery rests on seat 174, seals the areas between the wells so that a vacuum applied to the chamber 162 through the fitting 166 may create a pressure drop across the filter membranes which close the bottoms of the wells. This is achieved by the sheet 178 sealing with the upper edges 26 of the wells. Because the seat 174 is essentially coplanar with the edges 26 of the wells, when the sheet is placed on the seat, it engages the upper edges 26, and a vacuum applied to the chamber 162 draws the sheet 178 tightly against the edges 26 and the seat 174. The sheet 178 includes an array of openings 210 arranged in rows along the X and Y coordinates of the holder. The holes are equal to or smaller than the inner diameter of the wells at the upper end, and the spacing of the holes 210 corresponds to the spacing between the wells so that seals may be formed on the edges 26 by the sheet 178 while at the same time the holes expose the interior of the wells to the ambient pressure.

The sheet 178 may either be a heat sealable film or a reusable compliant rubber. If a film is used, it may be bonded to the seat 174 and to the top edges 26 of the wells. In that case, the seals obviously would not be dependent upon the vacuum of the manifold. If the sheet is made of a compliant rubber-like material intended to be reused, the seals are formed about the top edges of the wells by the application of the vacuum to the chamber 162 through the fitting 166. The soft compliant rubber will readily pull against the top edges 26 of the wells and the seat 174 under the low pressure in the chamber.

Figure 7:
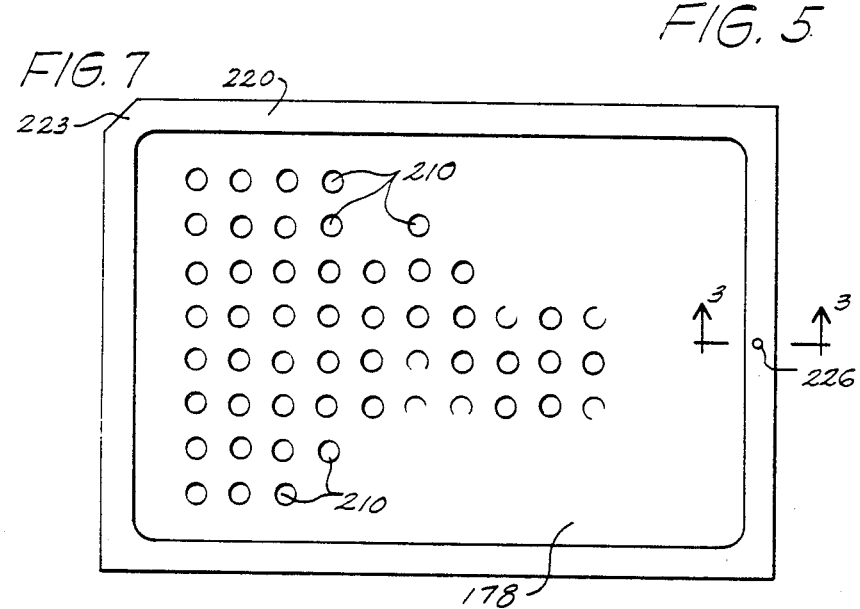
FIG. 7 is a plan view of the sealing sheet and rim shown in FIG. 4.

In FIGS. 4 and 7, the sheet 178 made of a compliant rubber like material and provided with the openings 210 is shown connected to a rim 220 which facilitates handling of the rubber like sheet and assists in accurately locating it on the manifold. The peripheral dimensions of the rim 220 conform precisely to the dimensions of the shoulder 221 separating the seats 174 and 176. The rim 220 may be made of rubber or plastic or other materials capable of being easily bonded to the rubber-like sheet and also capable of being autoclaved or otherwise sterilized in a manner suitable for its application. Obviously, the rim can also be molded integrally with the rubber sheet.

In FIG. 5, it will be noted that one corner 222 of the seat of shoulder 221 is beveled so that its face 224 is disposed diagonally with respect to the X and Y coordinates. Similarly the rim 220 is beveled at one corner 223, which requires that the rubber sheet always be mounted on the manifold in the same position with its openings 210 registering with the corresponding wells. The shoulder 221 is tall enough so that the rim 220 extends beneath its upper edge and sits securely in position.

The rim 220 is provided with a hole 226 which registers with a corresponding hole 228 in the sheet 178 as shown in FIG. 8. While the hole may be located any place in the rim so long as it communicates with the chamber 162, preferably it is positioned adjacent the fitting 166. The hole 226 is small enough to be closed by a finger of the operator, and it may control the application of the vacuum to the chamber 162 by the vacuum system (not shown) connected to the fitting. The hole 226 (with hole 228) allows the manifold to be loaded with the strips and holder and the sheet 178 to be applied while the vacuum is on. Moreover, the filtrate may be introduced to the wells at the same time. To create the differential pressure across the filters at the bottoms of the wells, the operator need only cover the hole 226 with his/her finger. In this fashion, the filtrate will be drawn through the filters. After substantially all of the filtrate has been pulled through the filters, air reaching the membrane surfaces causes the filter to bubble point and flow through the filters stops. The bubble point seals of those wells which have emptied allows the vacuum to continue to draw filtrate through the filters of the other wells until all the wells have emptied. When all the wells are emptied and their filters sealed, the lack of air flow through the filter membranes may cause some filtrate to remain on the surface 170 of the manifold bottom wall, and this filtrate residue on the bottom wall 158 can be sucked out of the chamber 162 through the fitting 166 simply by uncovering the port 226. By removing the finger from the port, the airflow is restored and the remaining filtrate on the bottom wall 158 will flow through the fitting aided by the vacuum as well as gravity.

Figure 9:
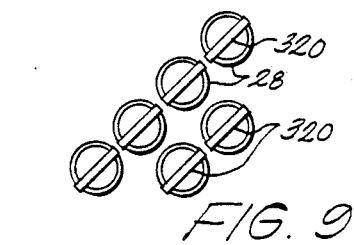
FIGS. 9 and 10 are fragmentary views of alternative post configurations which may be used in the manifold.
Figure 10:
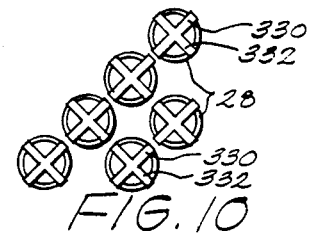

In certain applications, particularly where the membrane used to seal the bottoms of the wells possesses little strength, it may be necessary or desirable to support the membrane so that is does not break when the vacuum is applied to the chamber 162. This support should be provided without providing a vehicle for cross contamination of the wells. In FIGS. 9 and 10, two different configurations are suggested for the posts which support the wells from the bottom. These different configurations are alternatives to the construction of the posts 200 shown in FIGS. 4 and 5.

In FIG. 9, the posts are in the shape of narrow diagonal ribs 320 which are positioned to engage the lower edge 28 of each well at diametrically opposed points as well as to support the membrane across its diagonal diameter. The diagonal ribs 320 are spaced from one another so as to prevent "cross-talk" between the membranes, and they also allow fluid to flow on the bottom wall 158 of the manifold between the posts toward the fitting 166.

In FIG. 10, the diagonal ribs are replaced by two crossed ribs 330 and 332 which are disposed diagonally with respect to the X and Y coordinates. The ends of each rib engage the lower edge 28 of the well at diametrically opposed points, and the two ribs are displaced 90 degrees from one another. The ribs 330 and 332 provide support for the filter membrane across two diameters displaced 90 degrees from one another. Thus, the configuration of FIG. 10 will provide more support for the membrane than the rib configuration of FIG. 9. At the same time, the cross configuration will resist "crosstalk" between adjacent wells.

From the foregoing description, those skilled in the art will appreciate the many advantages derived from the manifold system of the present invention. Because numerous modifications may be made of the structure without departing from the spirit of this invention, we do not intend to limit the scope of this invention to the embodiments illustrated and described. Rather, it is intended that the scope of this invention be determined by the appended claim and their eguivalents.

We claim:

1. A filtration system for handling 96 well filter plates or filter strips wherein the plates or strips have an array of wells each including a generally cylindrical side wall closed at the bottom by a filter membrane and open at the top comprising
    a manifold having continuous side and end walls and a bottom wall connected to the side and end walls upwardly of the bottom edges thereof so as to be disposed above a supporting surface when the manifold is placed with lower edges of the side and end walls on the surface,
    a shoulder in the side and end walls for supporting a plate or strip placed in the manifold,
    a plurality of supports extending upwardly from the bottom wall for engaging the filter membranes disposed at the bottom of the cylindrical wall of each well when the plate or strip is supported on the shoulder,
    a first sealing surface in the side and end walls coplanar with the open tops of the cylindrical walls of the wells when the plate or strip is disposed in the manifold and the bottoms of the cylindrical walls are engaged by the supports,
    a sheet of sealing material disposed on the first sealing surface and engaging the tops of the wells and having means defining openings therein registering with the open tops of the cylindrical walls, said sheet preventing entry of material between said wells,
    a vacuum hose fitting in one of the side or end walls for connecting a low pressure source to the manifold above the bottom wall, the low pressure source causing the sheet of sealing material to seal about the tops of the cylindrical walls and draw filtrate material in the wells through the filter membrane,
    an imperforate removable film disposed over the top of the manifold for maintaining a sterile atmosphere in the manifold prior to use,
    and a second sealing surface in the side and end walls and disposed above the first surface for supporting the imperforate removable film.

2. A filtration system for handling an array of filter wells supported together on a frame either integral with or connected to the wells, each of said wells having a generally cylindrical side wall and a top of the well which is open and a bottom of the well which is closed by a filter membrane, top edges of the wells and bottom edges of the wells lying in parallel planes, said system comprising
    a manifold having continuous side walls and a bottom wall together defining a chamber open at a top thereof,
    a vacuum hose fitting in one of the side walls for connecting the chamber to a low pressure source,
    a first support in the chamber for engaging the frame of the wells for supporting the wells with the filter membranes thereof spaced above the bottom wall of the manifold,
    a plurality of additional and spaced apart supports engaging the bottom edges of the well walls when the frame is on the first support for maintaining a coplanar relationship of the wells in the manifold,
    and a removable sealing sheet mounted on the manifold side walls and extending over the top edges of the cylindrical walls of the wells for sealing against said top edges when said low pressure source is connected to said fitting, said sheet having means defining openings therein registering with the open tops of the wells.

3. A filtration system as defined in claim 2 wherein a rim is connected to the periphery of the sealing sheet,
    and a seat for the rim is provided in the side walls of the manifold for supporting the sheet in a plane of the top edges of the wells.

4. A filtration system as defined in claim 3 wherein the first support carries the frame with the wells in an X and Y format and said additional supports are oriented to maximize the space between said additional supports for preventing cross contamination between the wells.

5. A filtration system as defined in claim 4 wherein the additional supports are oriented in diagonal rows.

6. A filtration system as defined in claim 2 wherein the first support carries the frame with the wells in an X and Y format and said additional supports are oriented to maximize space between said additional supports for preventing cross contamination between the wells.

7. A filtration system as defined in claim 6 wherein the additional supports comprise an array of pins for engaging the lower edges of the well walls.

8. A filtration system as defined in claim 7 wherein two pins engage the lower edge of each well wall approximately 180 degrees displaced from one another.

9. A filtration system as defined in claim 2 wherein the vacuum hose fitting is in a side wall of the manifold immediately adjacent the bottom wall, and the bottom wall of the manifold tilts downwardly toward the fitting.

10. A filtration system as defined claim 2 wherein means are provided for the manifold, which extend below the bottom wall to support said bottom wall above a surface on which the manifold is placed.

11. A filtration system as defined in claim 10 wherein said means for supporting the bottom wall comprises a lower portion of the side walls.

12. A filtration system as defined in claim 2 wherein. an imperforate removable film disposed over the top of the manifold for maintaining a sterile atmosphere in the manifold prior to a sealing surface provided in the side walls for supporting the imperforate and removable film.

13. A filtration system as defined in claim 2 wherein the sealing sheet is made of a rubber-like material.

14. A filtration system as defined in claim 13 wherein
    a rim is connected to the periphery of the sealing sheet,
    and a seat for the rim is provided in the side walls of the manifold for supporting the sheet in a plane of the top edges of the wells.

15. A filtration system as defined in claim 2 wherein means defining a hole is provided in the sheet in addition to the openings which register with the tops of the wells and which are closed when low pressure is applied to the chamber.

16. A filtration system as defined in claim 2 wherein the additional supports each include means for supporting the membrane at the bottom of each well.

17. A filtration system as defined in claim 2 wherein the additional supports comprise an array of pins for engaging the lower edges of the well walls.

18. A filtration system as defined in claim 17 wherein two pins engage the lower edge of each well wall,
    said pins being disposed approximately 180 degrees displaced from one another.

19. A filtration system for handling an array of filter wells supported together on a frame either integral with or connected to the wells, each of said wells having a generally cylindrical side wall with top and bottom edges and with a top of each well being open and a bottom being closed by a filter membrane, said system comprising
    a manifold having side and bottom walls together defining a chamber open at a top thereof,
    a vacuum hose fitting in one of said side or bottom walls for connecting the chamber to a low pressure source,
    a first support in the chamber for engaging the frame of the wells and supporting the wells in the chamber,
    a collection region in the chamber for filtrate drawn through the filter membranes,
    a plurality of additional and spaced apart supports engaging the bottom edges of the well walls when the frame is on the first support for preventing the membranes from sagging in the chamber,
    and a removable sealing sheet disposed on the manifold and extending over the upper edges of the cylindrical walls of the wells for sealing against said edges when said low pressure source is connected to the fitting, said sheet having means defining openings therein registering with the open tops of the wells.

20. A filtration system as defined in claim 19 wherein
    a relatively rigid rim is connected to the periphery of the sealing sheet, and
    means is connected to the manifold for engaging the rim for supporting the sheet above a plane of the top edges of the wells.

21. A filtration system for handling an array of filter wells, each having an open top and a filter membrane at a bottom thereof, comprising
    a manifold having walls defining a chamber for receiving the filter wells,
    a support in the chamber for holding the wells, with respective filter membranes, spaced from the chamber walls so that a filtrate may be drawn through the filter membranes into the chamber,
    a sealing sheet disposed on the manifold engaging the open top of each well and having means defining holes therein registering with the open tops of the wells,
    and means for connecting a low pressure source to the chamber for pulling the sheet tightly against the tops of the wells to close the chamber between the wells and draw said filtrate in the wells through the filter membranes.

22. A filtration system as defined in claim 21 wherein means are provided in the chamber for supporting the bottoms of the wells.

23. A filtration system for handling an array of filter wells supported together on a frame either integral with or connected to the wells, each of said wells having a continuous side wall with top and bottom edges and with a top of each well being open and a bottom being closed by a filter membrane, said system comprising
    a manifold having side and bottom walls together defining a chamber open at a top thereof,
    a vacuum hose fitting in one of said side or bottom walls for connecting the chamber to a low pressure source,
    a first support in the chamber for engaging the frame of the wells and supporting the wells in the chamber,
    a collection region in the chamber for filtrate drawn through the filter membranes,
    a plurality of additional and spaced apart supports engaging the bottom edges of the well walls when the frame is on the first support for preventing the membranes from sagging in the chamber,
    and a sealing sheet disposed on the manifold extending over the upper edges of the continuous walls of the wells for sealing against said edges when said low pressure source is connected to the fitting, said sheet having openings therein registering with the open tops of the wells.

* * * * *